June 17, 1941. F. W. HUBER Re. 21,832

METHOD OF AND APPARATUS FOR ELECTRICALLY EXPLORING EARTH FORMATIONS

Original Filed May 21, 1935 2 Sheets-Sheet 1

INVENTOR.
Frederick W. Huber
BY Lyon & Lyon
ATTORNEYS

June 17, 1941. F. W. HUBER Re. 21,832

METHOD OF AND APPARATUS FOR ELECTRICALLY EXPLORING EARTH FORMATIONS

Original Filed May 21, 1935 2 Sheets-Sheet 2

INVENTOR.

Frederick W. Huber

BY Lyon & Lyon

ATTORNEYS

Reissued June 17, 1941

Re. 21,832

UNITED STATES PATENT OFFICE 21,832

METHOD OF AND APPARATUS FOR ELECTRICALLY EXPLORING EARTH FORMATIONS

Frederick W. Huber, deceased, late of Riverside, Calif., by Schlumberger Well Surveying Corporation, Houston, Tex., assignee Original No. 2,072,950, dated March 9, 1937, Serial No. 22,533, May 21, 1935. Application for reissue February 23, 1939, Serial No. 258,110

11 Claims. (Cl. 175—182)

This invention has to do broadly with the exploration of earth formations by electrical methods but relates more particularly to electrical explorations conducted through drill holes and has special application in connection with the mapping of formations penetrated by oil wells, water wells, and the like.

A broad object of the invention is to reduce the cost and time required in electrically exploring earth formations while at the same time increasing the amount of useful information obtainable from the exploration.

Various specific objects and features of the invention will be disclosed in the detailed description with reference to the drawings, which follows:

Some methods of electrical exploration of earth formations have been known for many years. Thus it is old to determine the specific resistivity of a body of earth in situ by means of the "four-terminal electrode" method which was first proposed by Searles of the United States Bureau of Standards and later elaborated by Wenner and applied by Gish and Rooney and others. This method has found extensive use in locating sub-surface minerals by means of electrical measurements made on the surface of the ground. The simplest way of practicing the four-electrode method is to employ four equally spaced electrodes disposed in a straight line and each making good electrical contact with the earth. The two outermost electrodes, called the input or current electrodes, are connected to an adequate current source, the circuit containing an ammeter. The two inner electrodes, called the potential electrodes, are not connected with the current source but have their leads connected to a potentiometer or other voltage measuring device. The current flowing between the two outermost electrodes creates an electric field in the earth between those electrodes and by means of the potentiometer the drop in potential in this field between the two potential electrodes is measured. Knowing (1) the value of the current flowing between the first two electrodes, (2) the distance between the electrodes, and (3) the potential difference between the potential electrodes, the specific resistivity of the earth between the potential electrodes can be deduced from the following formula credited to Wenner:

$$P=2\pi r\left(\frac{E}{I}\right)$$

in which

P=the specific resistivity of the earth between the specific electrodes;

$r$=the potential electrode spacing;

E=the difference in potentials between the potential electrodes; and

I=the current flowing between the input electrodes.

It has been experimentally found by Gish and Rooney that the depth to which the sub-surface may be explored by surface measurements is approximately equal to the distance the potential electrodes are spaced apart.

In the four-electrode methods devised by Searles, the potential electrodes may be positioned between the input electrodes or one or both of the potential electrodes may be positioned outside of the input electrodes.

The four-electrode method of Searles and Wenner for forming specific resistivities is applicable to making such measurements in a vertical as well as a horizontal plane (for instance, in a mine shaft or a bore hole) as long as the electrodes make good and sufficient electrical contact with the earth being explored. The problem of making good and sufficient electrical contact with the formation to be explored does not exist in a bore hole where good practice dictates that the hole be kept filled with the mud-laden drilling fluid. When applying the four-electrode method to measurements in a bore hole, a ground at earth surface can constitute one of the electrodes, three electrodes being employed in the bore hole, or there can be two grounds at earth surface and two electrodes down the bore hole. In each case, however, there are four electrodes and in each case specific resistivities are computed by applying Wenner's formula or a modification thereof.

However, Wenner's formula holds only for homogeneous earth masses of constant specific resistivity. Where the resistivity changes from point to point, factors and coefficients have to be introduced, which make the method at best but an approximation.

In all the prior methods based upon the four-electrode principle, the specific resistivity is deduced from the current value flowing in the input circuit and the potential difference existing between the potential electrodes. The consecutive values of the specific resistivity obtained upon moving the electrode system throughout the length of a bore hole may be plotted to provide a curve trace from which the position of the discontinuities of the strata can be located. It is important to note, however, that by this system only one geologically significant curve is obtained, i. e., a curve indicating the position of the discontinuities. This curve does not indicate the nature of the fluid contained in the permeable strata penetrated by the bore hole.

In accordance with the present invention it was discovered that the geological discontinuities of the strata penetrated by a bore hole can be located very accurately by a method not involving the four-electrode method and that the nature of the fluid in the porous strata can be definitely determined simultaneously by a modification of the four-electrode method without having to know the value of the current flowing in the circuit.

In accordance with these discoveries, the discontinuities in the strata are located by recording deflections of a galvanometer in a single circuit consisting of a source of current connected between ground and an electrode movable through the bore hole. The galvanometer is located in a network in the circuit and this network and the method in which it is used constitutes one of the novel features of the invention.

More specifically, this circuit consists of an adequate current source connected across one diagonal of a Wheatstone bridge circuit with a galvanometer connected across the other diagonal. Three of the arms of the bridge are constituted by artificial resistances and the fourth arm is constituted by the resistance of the earth between the ground electrode and the movable electrode in the bore hole. It is old to measure resistance with a Wheatstone bridge, the well known method of procedure being to vary the artificial resistance in one or more of the arms of the bridge until no current flows through the galvanometer connected across one diagonal thereof. The unknown resistance is then computed from the values of the known resistances in the three arms of the bridge. This method gives very accurate results but has the serious objection in well surveying that it is slow, it being necessary to manually adjust the calibrated resistance elements of the bridge until a balance is obtained, as indicated by a zero reading of the galvanometer, before the resistance can be determined. In the present system, instead of balancing the unknown resistance by a known resistance until a zero galvanometer reading is obtained, the general nature of resistance variations is determined as the electrode is moved through the bore hole by recording the deviations of the galvanometer needle from an arbitrary zero point (after the system has been adjusted to bring the galvanometer movements within a desired range). To limit the swing of the galvanometer needle to a suitable value, a large adjustable resistance is connected in series therewith. Although various methods of recording might be employed, it has been found satisfactory to use a mirror on the galvanometer suspension which reflects a light beam from a fixed source onto a moving photographic strip, the motion of which is made to synchronize with that of the electrode traversing the bore hole, thereby tracing a curve which is some function of the changes in resistance of the formation adjacent the movable electrode in the hole at different levels in the hole. From the curve so traced, the discontinuities in the strata are located as will be more fully explained hereafter.

The curve obtained by the procedure just described not only locates the discontinuities of the strata but in a great many fields also gives an indication of the nature of the fluid contained in the permeable strata. However, there are fields in which this indication is not positive enough to warrant definite conclusions as to the nature of the fluid contained. In accordance with the invention, it was also discovered that this limitation may be overcome by introducing a second electrode at a fixed definite distance from the first electrode in the bore hole and recording the changes in the potential drop between this second electrode and the ground surface as the electrodes are moved through the hole. To record these potential changes it is preferable to employ a galvanometer with a large adjustable resistance in series therewith, the galvanometer suspension having a mirror thereon which reflects light from a fixed source onto a moving photographic strip which may be the same strip upon which the first mentioned curve is produced. The two curves when compared with each other give information which permits definite conclusions being drawn as to the nature of the fluid contained in the permeable strata, even though the drill hole fluid may have penetrated some distance into the strata and displaced the natural fluids therein.

It is most important to note that although the basis of the procedure is purely empirical, the results obtained are of great practical significance.

The apparatus and procedures employed in accordance with the invention will now be explained with reference to the drawings, in which Figure 1 is a schematic view illustrating a preferred form of apparatus in accordance with the invention;

Fig. 5 is a highly schematic diagram illustrating an alternative type of exploring cable and associated circuit to that shown in Fig. 1; and Fig. 6 is a schematic diagram showing still another alternative electrode and circuit arrangement.

Figure 1:
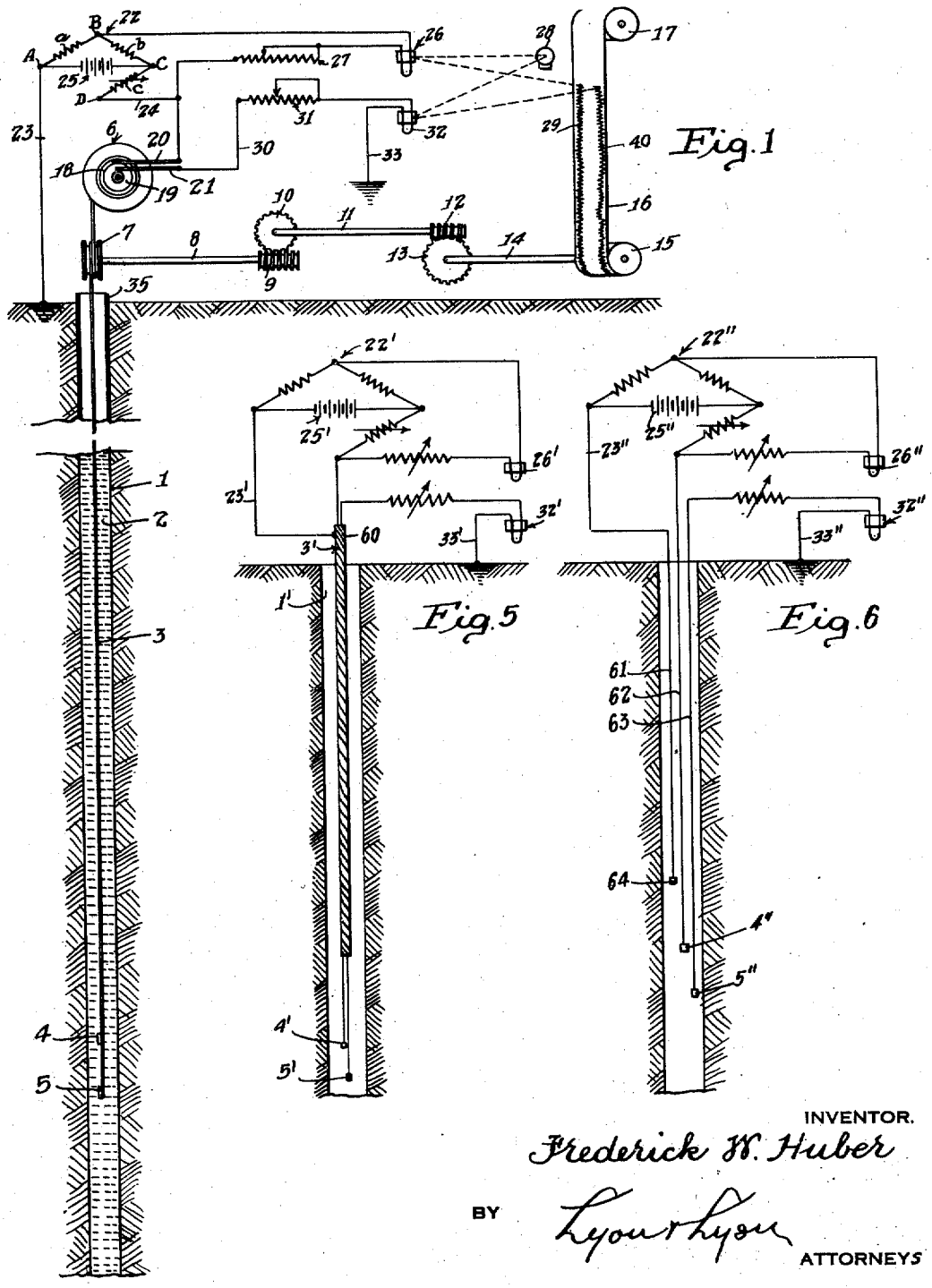

Referring, first, to Fig. 1, an uncased bore hole 1 containing drilling fluid 2 is shown penetrating a formation to be explored. It may be assumed that the bore hole is in an oil field and intended to be a productive well, the fluid 2 consisting of the usual drilling fluid containing a suitable mud, which fluid was left in the hole following removal of the drill.

The exploring apparatus proper comprises an insulated cable 3 containing a pair of electrical conductors, each of which is connected at the lower end of the cable to separate electrodes 4 and 5, respectively. The cable 3 will have a total length somewhat in excess of the depth of the hole to be explored, which cable is normally wound upon a drum 6 positioned adjacent the top of the well. The cable is unwound from the drum 6 to lower the electrodes 4 and 5 into the hole, and is rewound upon the drum to raise the electrodes. Between the drum 6 and the hole the cable passes around a spool or drum 7 which functions to move a recording tape in synchronism with the movements of the electrodes 4 and 5. Thus the spool 7 is shown mounted on a wormshaft 8 bearing a worm 9 which meshes with a wormwheel 10 on one end of a shaft 11 upon the other end of which is mounted a second worm 12 which meshes with a wormwheel 13 mounted on a shaft 14 which turns a spool 15 to wind a photographic film 16, the film being supplied from a feed spool 17.

The two conductors within the cable 3 are connected to the electrodes 4 and 5, respectively, at the lower end of the cable and are connected at the opposite end of the cable to a pair of contact segments 18 and 19, respectively, on the exterior of drum 6, which segments are contacted by brushes 20 and 21, respectively. Segment 18 connects to the conductor associated with electrode 4, and segment 19 is connected to the conductor associated with electrode 5.

In operation a potential is impressed between ground and the electrode 4 and provision is made for indicating variations in the resistance between these points. To this end the brush 20 is connected to one terminal D of a Wheatstone bridge 22, an adjacent terminal A of which is connected to ground by a conductor 23. The conductor 23, the earth path from conductor 23 to the electrode 4, the cable conductor connected to electrode 4, the segment 18, the brush 20 and the conductor 24 extending between brush 20 and the terminal D constituting the unknown arm of the bridge 22, equal resistances *a* and *b* constitute the fixed arms of the bridge between terminals A and B and B and C, respectively, and an adjustable resistance *c* constitutes the arm of the bridge between terminals C and D. A constant potential is impressed across the terminals A and C by a source of potential 25 which is shown as a battery but may be a generator. The poles B and D of bridge 22 are connected to a recording voltmeter which may consist of a mirror galvanometer 26 connected in series with an adjustable resistance 27.

Although referred to as a mirror galvanometer, the device 26 is preferably a relatively rugged milliammeter, having a mirror mounted on its moving coil. This mirror is adapted to reflect a beam of light from a lamp 28 onto the sensitive film 16 to produce (after the film has been developed) a record 29.

The segment 19 and associated brush 21 are connected through the second conductor of the cable 3 to the electrode 5 which, as previously stated, is electrically distinct from and spaced a predetermined distance from the electrode 4. This electrode is connected through segment 19, brush 21, a conductor 30, adjustable resistance 31, and a second mirror galvanometer 32 to ground over a ground conductor 33. Galvanometer 32 functions to indicate variations in the potential drop between ground and electrode 5, which results from the earth current produced by the battery 25 between earth and the electrode 4. Galvanometer 32 is so positioned as to reflect a beam of light from the lamp 28 onto the film 16 at a point substantially juxtaposed to the beam from the galvanometer 26.

The electrodes 4 and 5 are first positioned within the hole adjacent the upper or surface end thereof, which portion of the hole is usually cased, as indicated at 35, and the bridge 22 is adjusted by adjustments of the resistance C until the galvanometer 26 produces a zero registration at a desired point on the film 16. This adjustment of resistance C to bring the galvanometer to the arbitrary zero reading is made without any reference to the value or direction of the current flowing through the galvanometer—there being no attempt whatever to balance the Wheatstone bridge and thus bring the galvanometer to zero indicating equal potential at B and D. Likewise the resistance 31 is varied to produce a predetermined desired deflection of the galvanometer 32 so as to position the beam reflected therefrom at a desired point on the film. Thereafter the cable is lowered into the hole at a uniform rate of speed to traverse the hole with the electrodes 4 and 5. At the same time the movement of the cable 3 rotates the drum 7 to cause the film 16 to be moved past the beams of light reflected thereon from the galvanometers 26 and 32, respectively, at a fixed speed relative to the movement of the cable.

Since the variations in total resistance of the circuit through the earth formation between the ground conductor 23 and the cable electrode 4 is largely dependent upon the resistance of the particular formation immediately adjacent the electrode 4, the resistance of that arm of the bridge between "A" and "D" varies with the movement of the electrode 4 past different formations. These variations in resistance cause variations in the ratios of the potentials existing across the different arms of the bridge and cause variations in potential between the poles B and D, which variations in potential produce deflections in the galvanometer 26 causing the beam of light reflected therefrom onto the film 16 to describe an irregular line upon the film.

The current flowing through the earth between the ground 23 and electrode 4 sets up an electric field in the earth, the relative intensity of the field in various points in the earth depending upon their distances from the electrodes and the various electrical properties of the strata adjacent those points. As the electrode 4 traverses the well bore, variations in the electrical properties of the strata traversed will therefore cause variations in the electrical field surrounding the electrode. In accordance with the discoveries of Gish and Rooney, these variations may be indicated by the use of the four-electrode system for a depth equal to the spacing of the potential electrodes.

Therefore the variations in the electrical properties of the formation between the hole and a point at a distance from the hole 1 substantially equal to the distance between the electrodes 4 and 5, causes a change in the potential between earth and the electrode 5, which changes in potential are impressed upon the galvanometer 32, causing the latter to describe an irregular line 40 upon the film 16. To provide for adjustment of the amplitude of movement of the galvanometers 26 and 32, respectively, the sensitivities of those instruments may be varied by adjusting the resistances 27, 31, respectively, which are connected in series therewith.

It will be apparent from the foregoing description that as the electrodes 4 and 5 are lowered through the hole 1 a record indicating at least the approximate variations in the resistance of the formation adjacent the hole, is made by the galvanometer 26, and, at the same time, a record of changes in the potential of the electrode 5 (which is a measure of the resistivity of the formation at a distance from the hole substantially equal to the distance of the electrodes 4 and 5), is made by the galvanometer 32. The fact that the recordings are made entirely automatically is of the utmost importance for the reason that it permits the electrodes to be run through the hole rapidly, thereby reducing the total time required for exploration and it also precludes any possibility of error due to the human element, such as frequently result where readings are taken by an observer and manually recorded.

The adjustable resistance 27 in series with the galvanometer 26 serves to regulate the total throw of the galvanometer needle from its established zero position. This makes it possible to vary the sensitivity of the galvanometer over a wide range and thus obtain any desired amount of detail on the curve trace produced. This is of great practical importance as the diameter of the hole and salinity of the drilling fluid in the hole influence the sensitivity to a marked degree. For example, if the sensitivity is adjusted to give good detail in a bore hole 6 inches in diameter, the same sensitivity adjustment when measurements are being made in a 12 inch hole would give little or no detail and the total throw of the galvanometer would be so small that the breaks in the curve would be more or less masked and the location of the discontinuities in the strata would not be indicated definitely. In other instances the salinity of the fluid in the bore hole might be such as to give too great a throw to the galvanometer needle, causing most of the curve to fall outside the limits of the recording strip or film. In practice, the sensitivity is adjusted by adjusting the resistor 27 immediately after the electrodes are lowered below the cased portion of the hole, at which level the bridge is adjusted, as previously described.

To prevent polarization effects, it is preferred to run the electrodes through the hole at a speed of not less than 30 feet per minute. However, it is usually desirable, in order to conserve time, to run the electrodes at substantially higher speeds, and speeds up to 600 feet per minute have been employed with very satisfactory results.

It is to be understood that measurements may also be taken by moving the electrodes from the bottom of the hole up to the surface while making recordings instead of, or in addition to, making recordings while lowering the electrodes.

Figure 2:
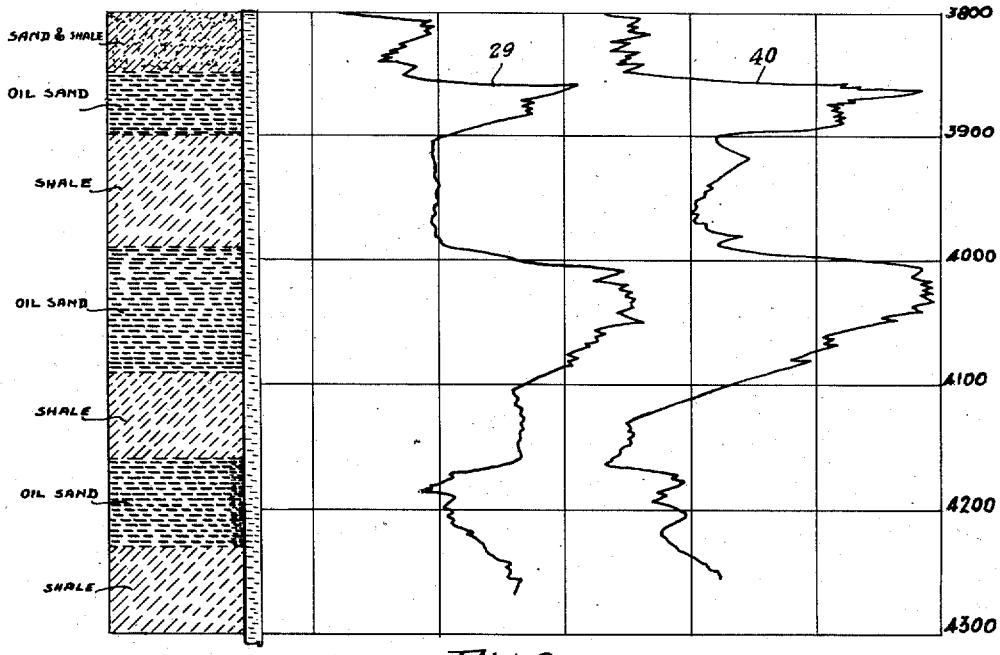
Fig. 2 is an explanatory chart showing the records obtained from exploring a formation with the apparatus illustrated in Fig. 1 in juxtaposed relation with a map of the formation penetrated by the well.

The records produced in the manner described are preferably made on film which is calibrated longitudinally in accordance with the distance traversed by the electrodes in the well hole. A portion of such a record is indicated in Fig. 2, and there is shown juxtaposed to the record a map of actual earth formations traversed by the electrodes. The curve 29 represents variations in resistance between earth and the current electrode 4 and the curve 40 represents variations in potential between earth and the electrode 5. The galvanometer 26 is preferably so poled that deflections to the right represent increased resistance adjacent the electrode 4 and the galvanometer 32 is so poled that deflection of curve 40 to the right represents a decreased potential impressed upon galvanometer 32, which is indicative of an increased resistance in the formation at a distance from electrode 5 equal to the distance between electrodes 4 and 5.

From an inspection of Fig. 2, it will be observed that at a depth between 3800 feet and approximately 3850 feet, where the electrodes were passing through a sand and shale formation, the curve 29 indicated a relatively low resistance and the curve 40 likewise indicated a relatively low resistance at a short distance from the hole. Thereafter, between the depths of substantially 3850 feet and 3900 feet the electrodes passed an oil sand which was indicated by rather violent deflections of the curves 39 and 40 to the right, indicating a higher earth resistance. Thereafter, from a depth of 3900 feet to substantially a depth of 4000 feet, the electrodes traversed a shale formation showing a relatively low resistance both adjacent the bore hole and at a short distance therefrom. Thereafter, from a depth of approximately 4000 feet to a depth of approximately 4100 feet, the electrode traversed an oil sand which increased the resistance adjacent both electrodes as shown by deflection of curves 39 and 40 to the right. From approximately 4100 feet to 4160 feet the electrodes again traversed a shale formation which is indicated on the curves 39 and 40 by relatively low resistance.

Figure 3:
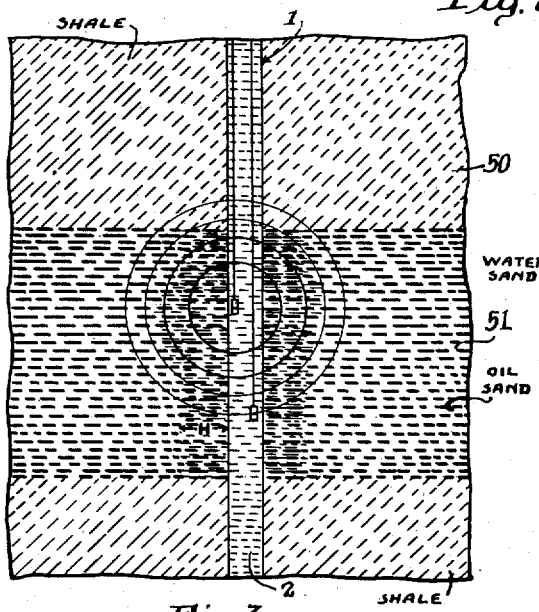
Fig. 3 is a schematic detail view, in cross section, showing that portion of a well bore lying within an oil sand, together with the electrodes of the exploring apparatus.
Figure 4:
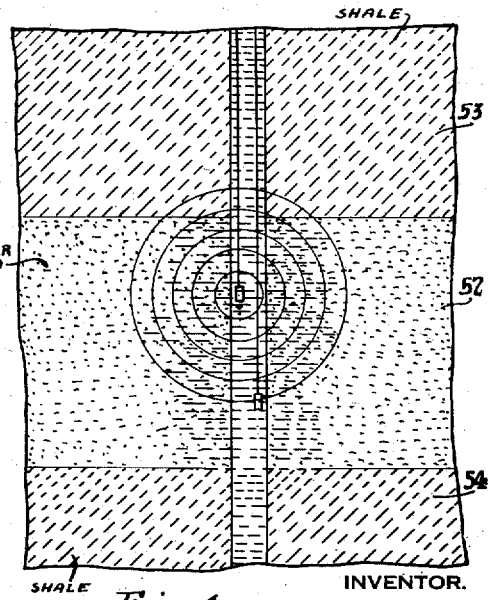
Fig. 4 is a view similar to Fig. 3, but showing the exploring electrodes located within a water-bearing sand stratum.

Below the last mentioned shale formation and extending substantially from a depth of 4165 to 4230 feet is an oil sand formation which would not be detectable from curve 29 alone. Thus it will be observed that in the oil sand formation which occurred at a depth between 3800 and 3900 feet the curve 29 was deflected violently to the right. Again in the oil sand formation between 4000 feet and 4100 feet curve 29 showed a sudden deflection to the right. However, from a depth of approximately 4160 to 4230 feet, curve 29 actually shows a deflection to the left, indicating a lower resistance adjacent the bore hole, which low resistance would, on its face, indicate a water sand rather than an oil sand (oil being a relatively poor conductor of electricity). However, it will be observed that whereas the curve 29 indicated a reduced resistance between the last mentioned depth, the curve 40 indicated an increased resistance. In other words, the two curves read together indicate that the resistance closely adjacent the bore hole decreased, whereas resistance at a distance from the bore hole increased. It has been found by experiments that the explanation of such an apparently anomalous result is found to be due to the fact that the pressure of the drilling fluid in the drill hole sometimes forces the oil in an oil bearing sand back away from the hole for a substantial distance the drilling fluid having relatively high conductivity replacing the oil in the sand immediately adjacent the hole. This condition is illustrated in Fig. 3, in which the hole 1 is shown passing through a shale formation 50 into an oil sand 51. The drilling fluid 2 within the bore hole 1 has permeated the oil sand to the distance H, forcing the oil back away from the hole. Whenever the curves 29 and 40 separate, as shown in Fig. 2 adjacent the 4200 foot depth, it is strongly indicative of an oil sand which has been permeated to a greater or less extent by the drilling fluid in the well, the different recordings resulting from the fact that the resistance in the formation at a distance from the hole is substantially greater than the resistance of the formation closely adjacent the hole. This divergence enables the operator to distinguish a permeated oil sand from a water sand. Thus there is shown in Fig. 4 a water sand formation 52 between shale formations 53 and 54 which is likewise permeated to a greater or less extent by the drilling fluid 2 in the bore hole 1. In this instance the resistance at a distance from the bore hole may be slightly greater than the resistance immediately adjacent the bore hole, but the resistivity at both points will be substantially less, for instance, than in the shale formations 53 and 54 immediately above and immediately below the water sand. In short, a divergence of the curves 29 and 40 indicates a divergence in the resistance characteristics of the formation adjacent the hole from the resistance characteristics of the formation at a distance from the hole equal to the spacing between the electrodes.

A formation, therefore, such as that shown at 52 in Fig. 4, would cause a deflection of both curves 29 and 40 to the left and the operator would be definitely apprised of the fact that the formation was not an oil or gas sand (oil and gas sand both having the characteristic of having a relatively high electrical resistivity).

The distance between the electrodes 4 and 5 usually varies between 2 to 15 feet, the optimum spacing depending upon the nature of the formation and the lateral distance to which the well fluid usually permeates an oil or gas sand. The current electrode 4 in Fig. 1 should be of substantial area, say from 25 to 100 square inches, in order to reduce the local resistance to a sufficient extent. The secondary electrode 5, however, may be very small as it does not have to carry appreciable current. The constants of the bridge 22 should be roughly proportioned to the resistances to be measured, and it has been found satisfactory to make resistances *a* and *b* 50 ohms; and the variable resistance *c* from zero to 200 ohms. The voltage of the battery or other source 25, is usually between 100 and 200 volts which, with the resistance value specified in the bridge arms applies a voltage across the terminals A and B of from 35 to 85 volts. The resistances 27 and 31 are preferably variable from approximately 100 to 200,000 ohms.

Various modifications may be made in the circuit and apparatus of Fig. 1. Thus instead of coordinating the movement of the film 16 with that of the cable 3 by the mechanical linkage shown in Fig. 1, the cable and film may be caused to move in synchronism with each other by any known synchronizing mechanism, such as the well known Selsyn motors.

Also various modifications may be made in the electrical circuit shown. Two such modifications are shown in Figs. 5 and 6, respectively, in which elements corresponding to those in Fig. 1 bear the same reference numerals with the single prime mark added in the case of Fig. 5, and the double prime mark added in the case of Fig. 6. The showing of the film and the mechanism synchronizing the film with the cable, together with the cable, are omitted in Figs. 5 and 6 to simplify the drawings.

The arrangement shown in Fig. 5 differs primarily from that shown in Fig. 1 in the method of making the ground connection to conductor 23': In Fig. 1 this ground connection was made by means of an electrode buried in the ground at any suitable point. In Fig. 5, the earth connection is made by employing a cable 3' having an external metallic armor 60 to protect the cable from mechanical abrasion and employing this armor as the ground connection by connecting the conductor 23' directly thereto. The conductor 33' from galvanometer 32' may also be grounded on the armor 60, if desired, although it is generally preferable to connect this conductor 33' to an independent ground.

It should be noted in this connection that it is not as important to have a low resistance ground connection for conductor 33' as for conductor 23' since the latter carries a substantial current whereas the current in the circuit including conductor 33' is of negligible value. The metallic armor 60 of course must be terminated a substantial distance above the electrodes 4' and 5' in order to make the resistance of the circuit including the electrode 4' sensitive to changes in the resistivities of the adjacent formation.

In Fig. 6 an arrangement is disclosed employing three electrodes connected to the surface by a cable having three electrically distinct conductors 61, 62, and 63, respectively. Conductors 62 and 63 are connected directly to electrodes 4'' and 5'' which correspond to electrodes 4 and 5 in Fig. 1, these electrodes being connected to the bridge 22'' and the galvanometer 32'' in the manner similar to the connections in the circuit of Figs. 1 and 5. The cable conductor 61, however, connecting to the additional electrode 64, connects to the conductor 23' and takes the place of the earth connection in Fig. 1 and the cable armor in Fig. 5. The potential impressed by the battery 25'' across the electrodes 64 and 4'' setting up a field therebetween, the strength of which is a function of the resistivity of the formation adjacent those electrodes. In Fig. 6, as in Fig. 5, the galvanometer 32'' is connected directly to an independent ground from conductor 33''.

Various other differences in the detail construction and operation of the circuits described may be made by those skilled in the art without departing from the spirit of the invention, and the invention is to be limited, therefore, only as set forth in the appended claims.

What is claimed, is:

1. In earth exploration, the method of determining the nature of the natural fluid contained in a porous formation traversed by a bore hole containing a conductive fluid, which comprises measuring and comparing variations in the electrical resistivity of the formation parallel and close to the bore hole where the formation is permeated with the conductive fluid of the bore hole and parallel to but spaced from the bore hole a distance greater than the distance of penetration of the bore hole fluid from the bore hole into the formation.

2. The method of determining the relative character of fluids in porous strata traversed by a bore hole at points closely adjacent the bore hole and at a predetermined distance away therefrom, respectively, the bore hole containing a relatively conductive driling fluid, which comprises moving a pair of electrodes which are spaced apart vertically approximately said predetermined distance along said hole through the drilling fluid therein, impressing an electric potential between one of said electrodes and ground at a point substantialy distant from said two electrodes, whereby the current through said one electrode is approximately proportional to the formation resistance immediately adjacent said one electrode, measuring the direction of deviation from a selected arbitrary value of said current through said electrode at all levels in said bore hole, and measuring the direction of variation from a selected arbitrary value of the potential difference created by said current between the other of said electrodes and ground at a point substantially distant from said electrodes, at all levels, the relative direction of deviation from said arbitrary values of said current and potential, respectively, at the levels of porous strata affording indications of the relative conductivities of the fluids in said strata at points adjacent and spaced from said bore hole, respectively.

3. The method of determining the character of geological formations penetrated by an uncased bore hole filled with conductive liquid which comprises passing a current between ground and a moving electrode traversing the bore hole whereby an electric field is produced in the formation surounding the said electrode, measuring the direction and approximate relative magnitude of variations of said current from an arbitrary reference value, said variations resulting from changes in the formation closely adjacent the moving electrode, simultaneously measuring the direction and approximate relative magnitudes of variations from an arbitrary reference value of the potential of said electric field at a moving point in said bore hole spaced a fixed distance from said moving electrode, for comparing and contrasting the variations in said current and said potential respectively, at different levels.

4. In earth exploration, the method of determining for different depths of investigation the nature of the strata traversed by a bore hole which comprises the steps of measuring simultaneously variations in an electrical characteristic of the formation through one depth of investigation relatively close to the bore hole, and variations in an electrical characteristic of the strata through a greater depth of investigation than that aforementioned, and comparing the said measured electrical characteristic variations.

5. In earth exploration, the method of determining for different depths of investigation the nature of the strata traversed by a bore hole which comprises the steps of measuring simultaneously variations in the resistivity of the formation through one depth of investigation relatively close to the bore hole, and variations in the resistivity of the strata through a greater depth of investigation than that aforementioned, and comparing the said measured resistivity variations.

6. In earth exploration, the method of determining the nature of the natural fluid contained in a porous formation traversed by a bore hole containing a conductive fluid, which comprises measuring and comparing variations in an electrical characteristic of the formation parallel and close to the bore hole where the formation is permeated with the conductive fluid of the bore hole and parallel to but spaced from the bore hole a distance greater than the distance of penetration of the bore hole fluid from the bore hole into the formation.

7. The method of exploring for different depths of investigation earth formations traversed by a drill hole which comprises the steps of passing current into the formations surrounding the drill hole, and simultaneously measuring and comparing the effects of the flow of said current in the part of the formations through one depth of investigation relatively close to the drill hole, and in the part of the formations through a greater depth of investigation than that aforementioned.

8. The method of exploring for different depths of investigation earth formations traversed by a drill hole which comprises the steps of moving an electrode through the drill hole, passing current through a circuit including the electrode, the earth and a grounded point, and simultaneously measuring and comparing the effects of the flow of said current in the earth in a zone through one depth of investigation relatively close to the electrode and in a zone through a greater depth of investigation than that aforementioned.

9. The method of exploring for different depths of investigation earth formations traversed by a drill hole which comprises the steps of moving an electrode through the drill hole, passing current through a circuit including the electrode, the earth and a grounded point, and simultaneously measuring and comparing variations in resistivity in the earth in a zone through one depth of investigation relatively close to the electrode and in a zone through a greater depth of investigation than that aforementioned.

10. Apparatus for exploring the formations traversed by a drill hole comprising an electrode movable through the drill hole, means for causing a current to flow through said electrode into the formations, means for measuring the resistivity of the formations in a zone close to the electrode, a second electrode in the drill hole, spaced apart from said first electrode and movable therewith, and means for measuring the potential difference between said second electrode and a grounded point to indicate the resistivity of the formations in a zone spaced from said first electrode.

11. The method of determining simultaneously in a bore hole containing conducting fluid, the relative nature of the strata traversed at points closely adjacent the bore hole and at a predetermined distance away therefrom, which comprises the steps of moving along the hole a pair of electrodes spaced apart vertically approximately said predetermined distance, impressing an electric potential between one of said electrodes and a ground point substantially distant from said two electrodes, whereby the current through said one electrode is a function of the formation resistance immediately adjacent said one electrode, measuring the direction of deviation from a selected arbitrary value of said current through said electrode at all levels in said bore hole, and simultaneously measuring the direction of variation from a selected arbitrary value of the potential difference created by said current between the other of said electrodes and a ground point substantially distant from said electrodes, at all levels, the relative direction of deviation from said arbitrary values of said current and potential, respectively, at the levels of said strata affording indications of the relative nature thereof, at points adjacent and spaced from said bore hole, respectively.

SCHLUMBERGER WELL SURVEYING CORPORATION,
*Assignee, by mesne assignments, of Frederick W Huber, Deceased,*
By EUGENE G. LEONARDON,
*Vice-President.*